(12) United States Patent
Kamada et al.

(10) Patent No.: US 7,908,450 B2
(45) Date of Patent: Mar. 15, 2011

(54) MEMORY MANAGEMENT UNIT, CODE VERIFYING APPARATUS, AND CODE DECRYPTING APPARATUS

(75) Inventors: Jun Kamada, Kawasaki (JP); Takayuki Hasebe, Kawasaki (JP); Souichi Okada, Kanagawa (JP); Takehiko Hayashi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 880 days.

(21) Appl. No.: 10/939,342

(22) Filed: Sep. 14, 2004

(65) Prior Publication Data

US 2005/0033973 A1 Feb. 10, 2005

Related U.S. Application Data

(63) Continuation of application No. PCT/JP02/05564, filed on Jun. 5, 2002.

(51) Int. Cl.
*G06F 12/14* (2006.01)
(52) U.S. Cl. ......... 711/164; 711/159; 711/163; 711/170; 711/203; 711/190; 711/193
(58) Field of Classification Search .................. 711/163, 711/203, 170, 164; 713/190, 193
See application file for complete search history.

(56) References Cited

U.S. PATENT DOCUMENTS

| | | | | |
|---|---|---|---|---|
| 4,847,902 A * | 7/1989 | Hampson | ...................... | 713/190 |
| 5,757,919 A | 5/1998 | Herbert et al. | | |
| 5,892,944 A | 4/1999 | Fukumoto et al. | | |
| 6,003,117 A | 12/1999 | Buer et al. | | |
| 6,253,320 B1 * | 6/2001 | Sekiguchi et al. | ................ | 713/2 |
| 6,651,171 B1 * | 11/2003 | England et al. | ............... | 713/193 |
| 6,658,543 B2 * | 12/2003 | Farmer et al. | ................. | 711/164 |
| 6,704,872 B1 | 3/2004 | Okada | | |
| 6,745,306 B1 * | 6/2004 | Willman et al. | ............. | 711/163 |
| 2001/0014157 A1 | 8/2001 | Hashimoto et al. | | |
| 2001/0018736 A1 | 8/2001 | Hashimoto et al. | | |
| 2003/0093643 A1 * | 5/2003 | Britt, Jr. | ........................ | 711/170 |
| 2005/0005080 A1 * | 1/2005 | Dunshea et al. | .............. | 711/159 |

FOREIGN PATENT DOCUMENTS

| | | |
|---|---|---|
| EP | 0 849 657 | 6/1998 |
| JP | 7-36713 | 2/1995 |
| JP | 11-345117 | 12/1999 |
| JP | 2001-230770 | 8/2001 |

OTHER PUBLICATIONS

European Search Report, mailed May 30, 2007 and issued in corresponding European Patent Application No. 02733323.6-1245.
Korean Office Action for Application No. 10-2004-7015085 issued Jan. 31, 2006 (2 pages) (English translation - 2 pages).

* cited by examiner

*Primary Examiner* — Yong Choe
(74) *Attorney, Agent, or Firm* — Staas & Halsey LLP

(57) ABSTRACT

A memory management unit manages a memory that stores a code, and sets that the memory that stores the code to be executed is valid to make a processor execute the code stores a verification key used to verify a validity of the code in a verification-key storing unit. When the code is stored in the memory and ready to be executed by the processor, the memory management unit verifies the validity of the code using the verification key stored in the verification-key storing unit and verification information assigned to the code. The memory management unit controls to set that the memory is valid when the validity is verified by the verifying unit, and not to set that the memory is valid when the validity is not verified by the verifying unit.

5 Claims, 10 Drawing Sheets

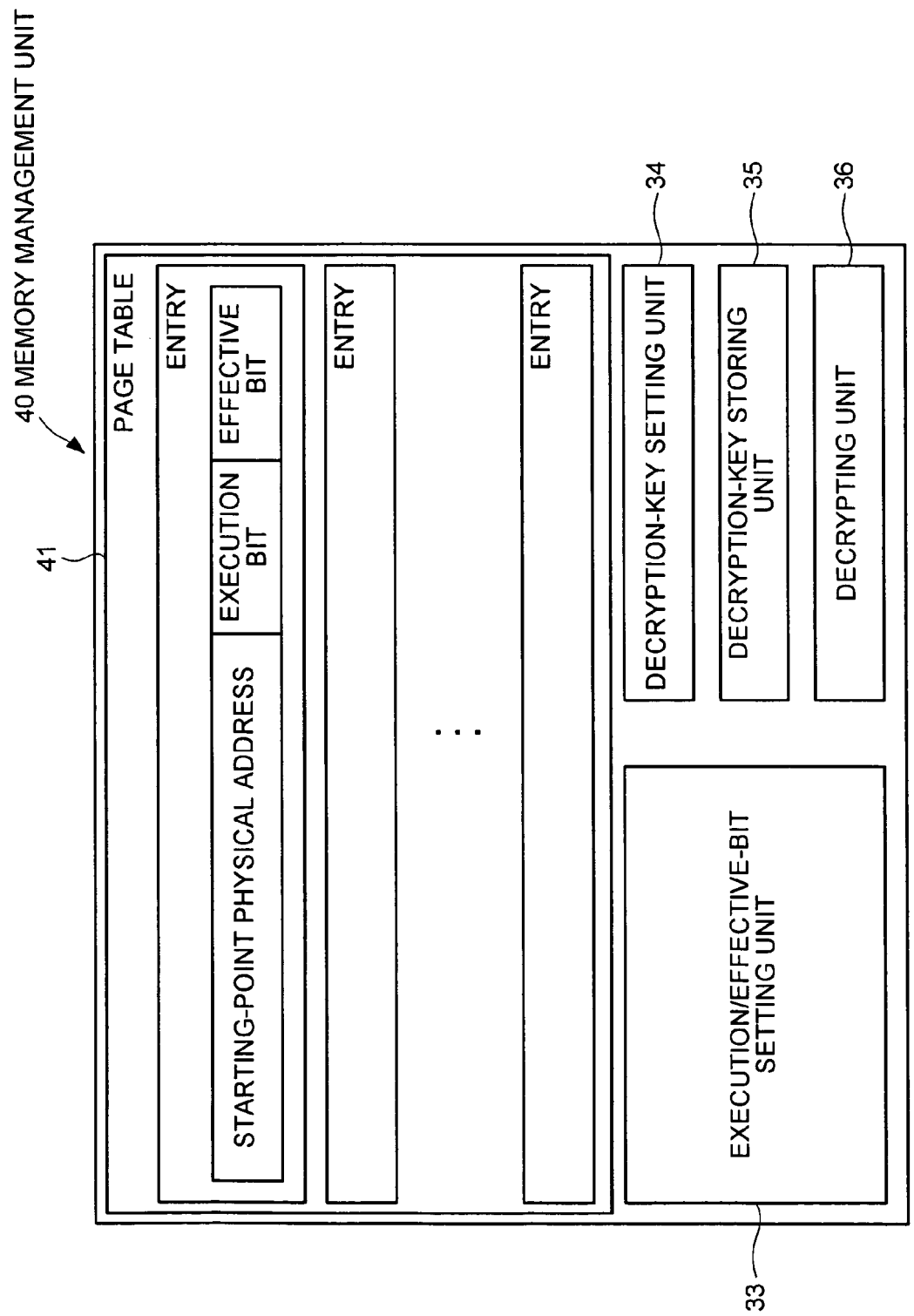

MEMORY MANAGEMENT UNIT, CODE VERIFYING APPARATUS, AND CODE DECRYPTING APPARATUS

This application is a continuing application, filed under 35 U.S.C. §111(a), of International Application PCT/JP02/05564, filed Jun. 5, 2002.

BACKGROUND OF THE INVENTION

1) Field of the Invention

The present invention relates to a memory management unit, code verifying apparatus, and a code decrypting apparatus incorporated in an information processing apparatus, such as a personal computer or a mobile communication terminal. More particularly, the present invention relates to a memory management unit, code verifying apparatus, and a code decrypting apparatus that can ensure validity of a code that is executed on the information processing apparatus, with ease and certainty, without changing architecture of a processor or a memory.

2) Description of the Related Art

It is desired that a secure code (a program that is described in machine language and interpreted by a central processing unit (CPU) to be executed) with ensured validity is executed on an information processing apparatus such as a personal computer or a mobile communication terminal. In other words, it is necessary to keep a specific code with a safety problem, which is altered by a malice third party before or after installation on a hard disk or the like, from being stored in a memory and executed on the apparatus.

Examples of a conventional technology that can satisfy the above desire are as follows:

(1) install an additional software for verification on the information processing apparatus, and verify the validity of a code using a verification information assigned to the code in advance, before executing the code; and (2) install an additional software for decrypting on the information processing apparatus, and ensure the validity of a code by decrypting the code that is encrypted in advance, before executing the code.

However, since the above technologies incorporate a specific software to verify or ensure the validity of a code, there is a possibility that the software for verification or decrypting itself can be altered, and it is not always possible to execute a safe code with ensured validity on the information processing apparatus.

When the software for verification is altered, there is a drawback that a code can be executed regardless of a result of the verification; and when the software for decrypting is altered, there is a drawback that a decrypted code can be altered before being execute. As a result, the above technologies cannot always guarantee that a safe code with ensured validity is executed on the apparatus.

Following methods can be considered to solve the problem arising from such software:

(1) attach an additional hardware for verification on a memory of the information processing apparatus, and verify a code assigned on a page that is a unit of memory assignment in a process, using the hardware for verification for every page; and (2) attach an additional hardware for decrypting on a processor of the information processing apparatus, and decrypt a fetched code using the hardware for decrypting.

However, development of such hardware is not easy. To attach a special hardware for verification on a memory or to attach a special hardware for decrypting on a processor is, in other words, to attach a new intelligence on a check portion of the memory or on a gate portion of the processor, respectively. It necessitates a considerable change of architecture of the processor or the memory, which cannot be developed with ease.

In the information processing apparatus, such as a personal computer or a mobile communication terminal, it is extremely important how to execute a safe code with ensured validity on the apparatus, and more preferably, it is necessary to develop a hardware that can solve the above problems with ease and certainty, without much changing the architecture of the processor or the memory.

SUMMARY OF THE INVENTION

The present invention is for solving the problems of the conventional technologies, and it is an object of the present invention to provide a memory management unit, a code verifying apparatus, and a code decrypting apparatus capable of ensuring the validity of a code being executed on the apparatus easily and certainly, without changing the architecture of the processor or the memory.

A memory management unit according to an aspect of the present invention manages a memory that stores a code, and sets that the memory that stores the code to be executed is valid to make a processor execute the code. The memory management unit includes a verification-key storing unit that stores a verification key used to verify a validity of the code; a verifying unit that verifies, when the code is stored in the memory and ready to be executed by the processor, the validity of the code using the verification key stored in the verification-key storing unit and verification information assigned to the code; and a control unit that sets that the memory is valid when the validity is verified by the verifying unit, and does not set that the memory is valid when the validity is not verified by the verifying unit.

A memory management unit according to another aspect of the present invention manages a memory that stores a code, and sets that the memory that stores the code to be executed is valid to make a processor execute the code. The memory management unit includes a decryption-key storing unit that stores a decryption key used to decrypt an encrypted code; a decrypting unit that reads, when the encrypted code is stored in the memory, the encrypted code out of the memory, decrypts the encrypted code using the decryption key stored in the decryption-key storing unit, and re-stores decrypted code in the memory; and a control unit that sets that the memory in which the decrypted code is re-stored is valid.

A code verifying apparatus according to still another aspect of the present invention verifies a validity of a code that is stored in a memory and executed by a processor, based on verification information assigned to the code. The code verifying apparatus includes a verification-key storing unit that stores a verification key used to verify the validity of the code, the verification key corresponding to the verification information; a verifying unit that verifies, when the code is stored in the memory and ready to be executed by the processor, the validity of the code using the verification key stored in the verification-key storing unit and the verification information assigned to the code; and a control unit that allows the processor to execute the code when the validity is verified by the verifying unit, and rejects execution of the code by the processor when the validity is not verified by the verifying unit.

A code decrypting apparatus according to still another aspect of the present invention decrypts an encrypted code stored in a memory to make a processor execute a code. The code decrypting apparatus includes a decryption-key storing unit that stores a decryption key used to decrypt the encrypted code; a decrypting unit that reads, when the encrypted code is stored in the memory, the encrypted code out of the memory, decrypts the encrypted code using the decryption key stored in the decryption-key storing unit, and re-stores decrypted code in the memory; and a control unit that controls the processor to execute the decrypted code re-stored in the memory.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 10 is a schematic for illustrating a configuration of a memory management unit according to a fourth embodiment of the present invention.

DETAILED DESCRIPTION

Exemplary embodiments of a memory management unit, a code verifying apparatus, and a code decrypting apparatus are explained in detail below with reference to the accompanying drawings. Various embodiments of a memory management unit according to the present invention are firstly explained as a first to a fourth embodiments, and a code verifying apparatus and a code decrypting apparatus according to the present invention and various examples of a modification are explained as other embodiments, and lastly, the effect of the present invention are described.

A first embodiment explains a case in which a verification function to verify a validity of a code executed by the processor is added to a memory management unit (MMU) that is installed in an information processing terminal, such as a personal computer, a workstation, or a mobile communication terminal. An outline and main features of a system to which the memory management unit according to the first embodiment is applied is explained, followed by an explanation of a configuration of the memory management unit, and then finally, a process procedure of the system is explained.

Figure 1:
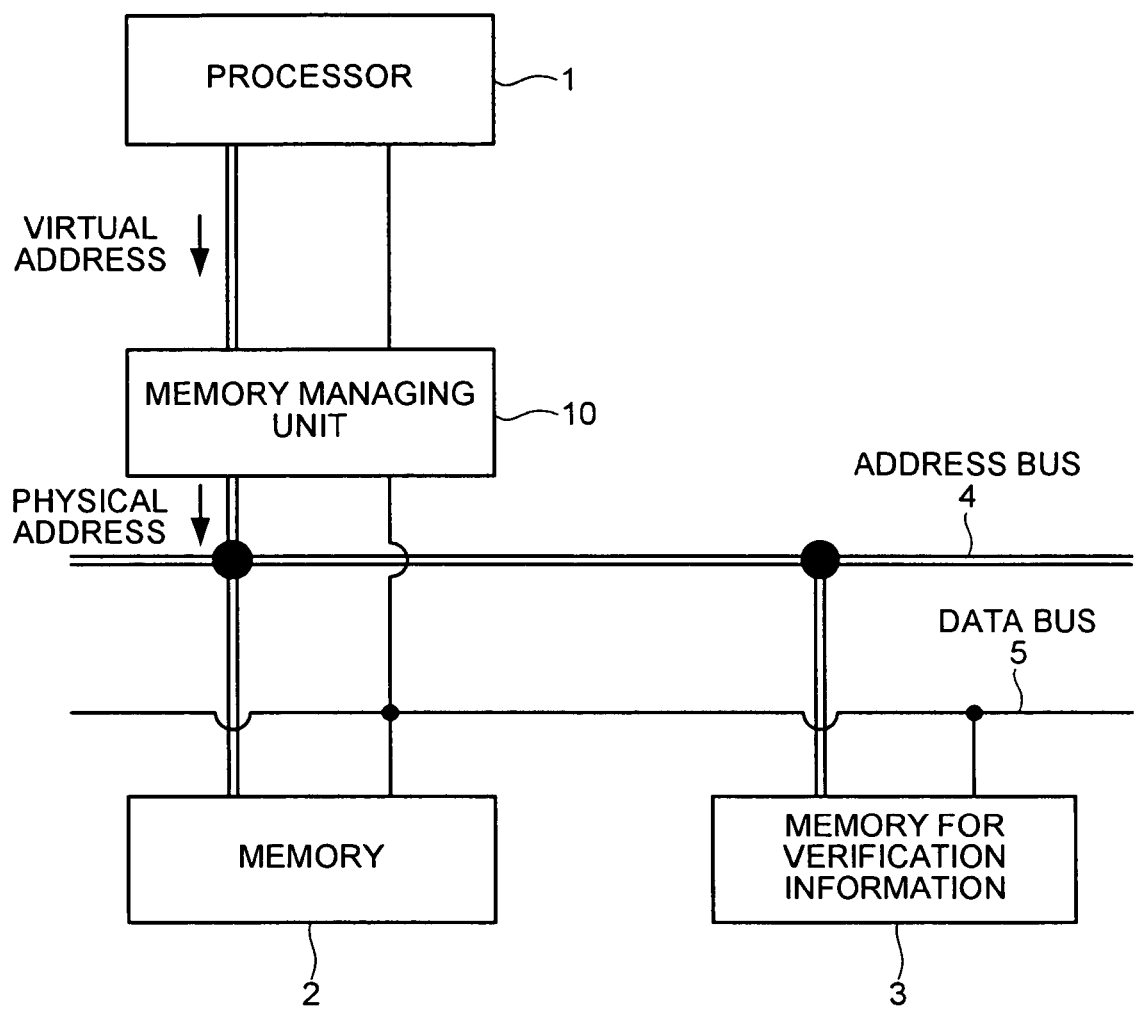
FIG. 1 is a block diagram of a system configuration to which a memory management unit according to a first embodiment of the present invention is applied.

First, the outline of the system to which the memory management unit according to the first embodiment is explained. FIG. 1 is a block diagram of a system configuration to which a memory management unit according to the first embodiment of the present invention is applied. The system is a part of an information processing terminal, such as a personal computer, a workstation, or a mobile communication terminal. A memory management unit 10 is arranged between a processor 1, a memory 2, and a memory for verification information 3, connected each other via an address bus 4 and a data bus 5.

The processor 1 is a processing unit (such as a CPU) that executes a code (a program described in machine language, and interpreted by the CPU to be executed) stored in the memory 2, and when executing the code, reads and writes data stored in the memory 2. The memory 2 is a storage unit that stores the code and the data used by the processor 1. The memory management unit 10 is a processing unit that manages the memory 2, particularly sets that the memory in which the code to be executed is stored is valid to make the processor 1 execute the code. The memory for verification information 3 is a storage unit that stores verification information that will be described later.

A schematic explanation of a process flow by the system is as follows. First, the processor 1 stores the code in the memory 2 via the memory management unit 10 for every predetermined page that serves as a unit of memory assignment (for example, 4 Kbytes). Then, if the memory management unit 10 sets that the memory in which the code is stored is valid, the processor 1 outputs a virtual address corresponding to the code to the memory management unit 10. The memory management unit 10 converts the virtual address input from the processor 1 into a physical address that is an address on the memory 2, and outputs the physical address to the memory 2. Finally, the code on the memory 2 corresponding to the physical address is executed by the processor 1.

The system shown in FIG. 1 is schematically a system in which the code stored in the memory 2 is executed by the processor 1, and the code includes verification information used to verify the validity of the code (such as an electronic signature or an electronic certificate). Namely, a main feature of the system is that the memory management unit 10 verifies the validity of the code using the verification information assigned to the code, so that the validity of the code to be executed on the information processing apparatus is ensured with ease and certainty, without changing an architecture of the processor 1 or the memory 2.

The memory management unit 10 stores a verification key used to verify the validity of the code in advance. The processor 1, when storing the code in the memory 2, stores the verification information assigned to the code in the memory for verification information 3. In this manner, when the processor 1 is able to execute the code stored in the memory 2, the memory management unit 10 verifies the validity of the code using the verification key stored in advance and the verification information stored in the memory for verification information 3. Then, when the validity of the code is verified, the memory management unit 10 controls to set that the memory 2 is valid, and when the validity is not verified, controls not to set that the memory 2 is valid.

With this mechanism, for a code having a safety problem due to an illegal change by a malice third party before or after installation of the code, the memory management unit 10, which is hardware that the malice third party cannot manipulate, definitely verify that the code is not valid at a predetermined moment just before execution of the code (i.e., at a timing when a conversion of a virtual page into a physical page becomes effective). Therefore, it is possible to avoid the execution of the code by the processor 1. Furthermore, since the memory management unit 10 having this type of verification function does not need to change the architecture of the processor 1 or the memory 2, it is possible to develop much easier, compared with developing a processor 1 or a memory 2 having a verification function.

From this point of view, according to the memory management unit 10 according to the first embodiment, the above main feature can be exercised that the validity of the code executed on the information processing apparatus can be ensured with ease and certainty, without changing the architecture of the processor 1 or the memory 2.

Figure 3:
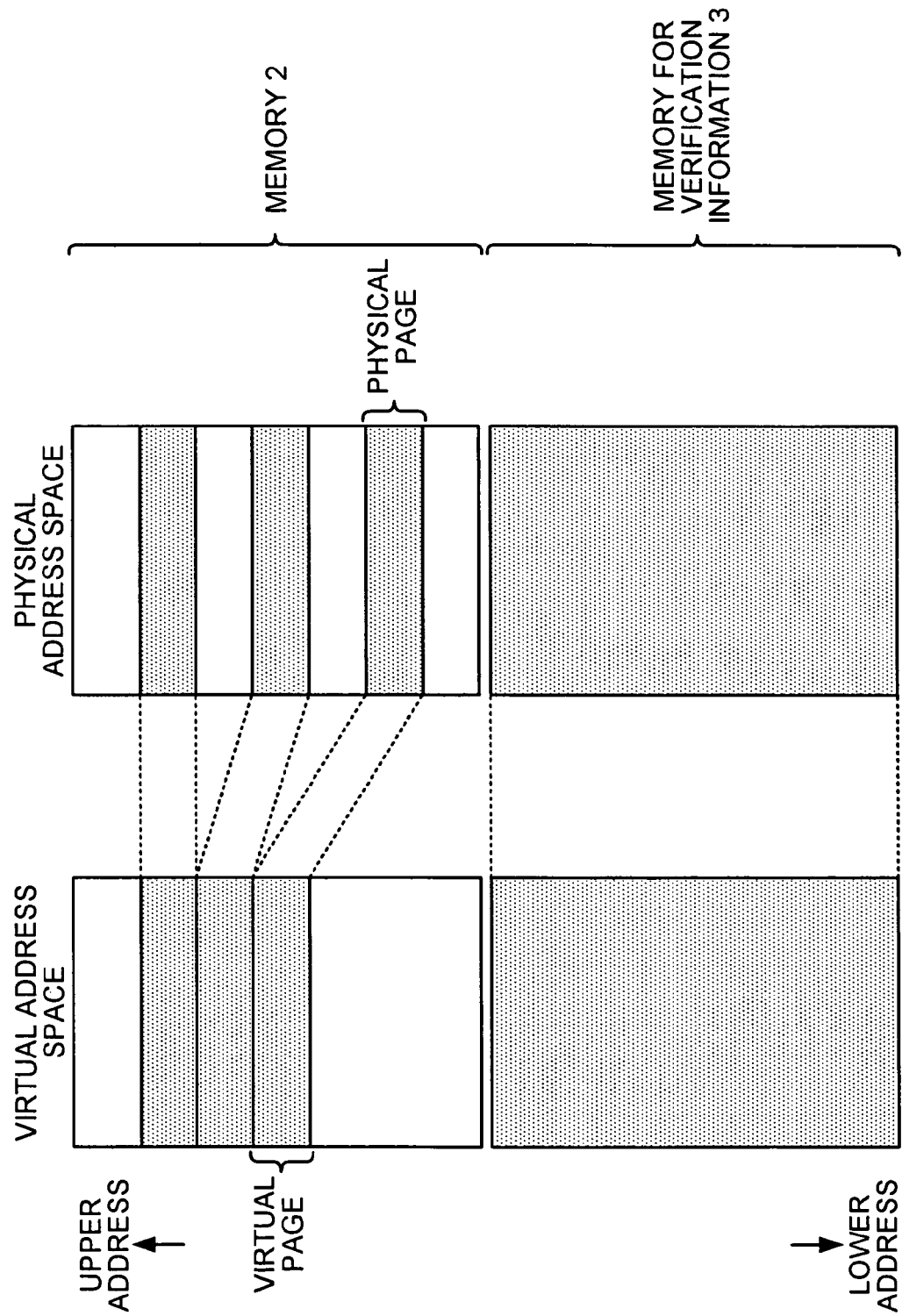
FIG. 3 is a schematic for explaining an address space according to the first embodiment.

Before describing a configuration of the memory management unit 10, an address space according to the first embodiment is briefly explained. FIG. 3 is a schematic for explaining an address space according to the first embodiment. When the processor 1 executes the code, the memory management unit 10 according to the first embodiment converts the virtual address input by the processor 1 into the physical address that is an address on the memory 2, and outputs the physical address converted to the memory 2. Namely the information processing apparatus to which the memory management unit 10 according to the first embodiment is applied is a system in which the virtual address is converted into the physical address, such as a personal computer, a workstation, or a mobile communication terminal.

The address space according to the first embodiment is formed by, for example, as shown in FIG. 3, assigning upper half of the virtual address space to the memory 2 after converting the virtual address into the physical address (for example, assigning every 4 Kbytes) and assigning lower half of the virtual address space to the memory for verification information 3 without converting the virtual address into the physical address. The virtual address space shown in FIG. 3 is divided into the upper half and the lower half for convenience of the explanation, and the operating system (OS) that is usually placed in the memory 2 is omitted in the figure.

Although the memory 2 and the memory for verification information 3 are arranged separately in the system shown in FIG. 1, the system may be configured in such a manner that a part of the memory 2 functions as the memory for verification information 3 by outputting a value to a specific input/output (I/O) port (i.e., using a bank switching method). The memory for verification 3 may also be assigned to an I/O space instead of the memory space.

In the first embodiment, 4 Kbytes of fixed length is used as a unit memory that is an assigning unit of the memory 2, however, the length of the unit memory can be variable, and even the entire memory 2 can be the unit memory.

Figure 2:
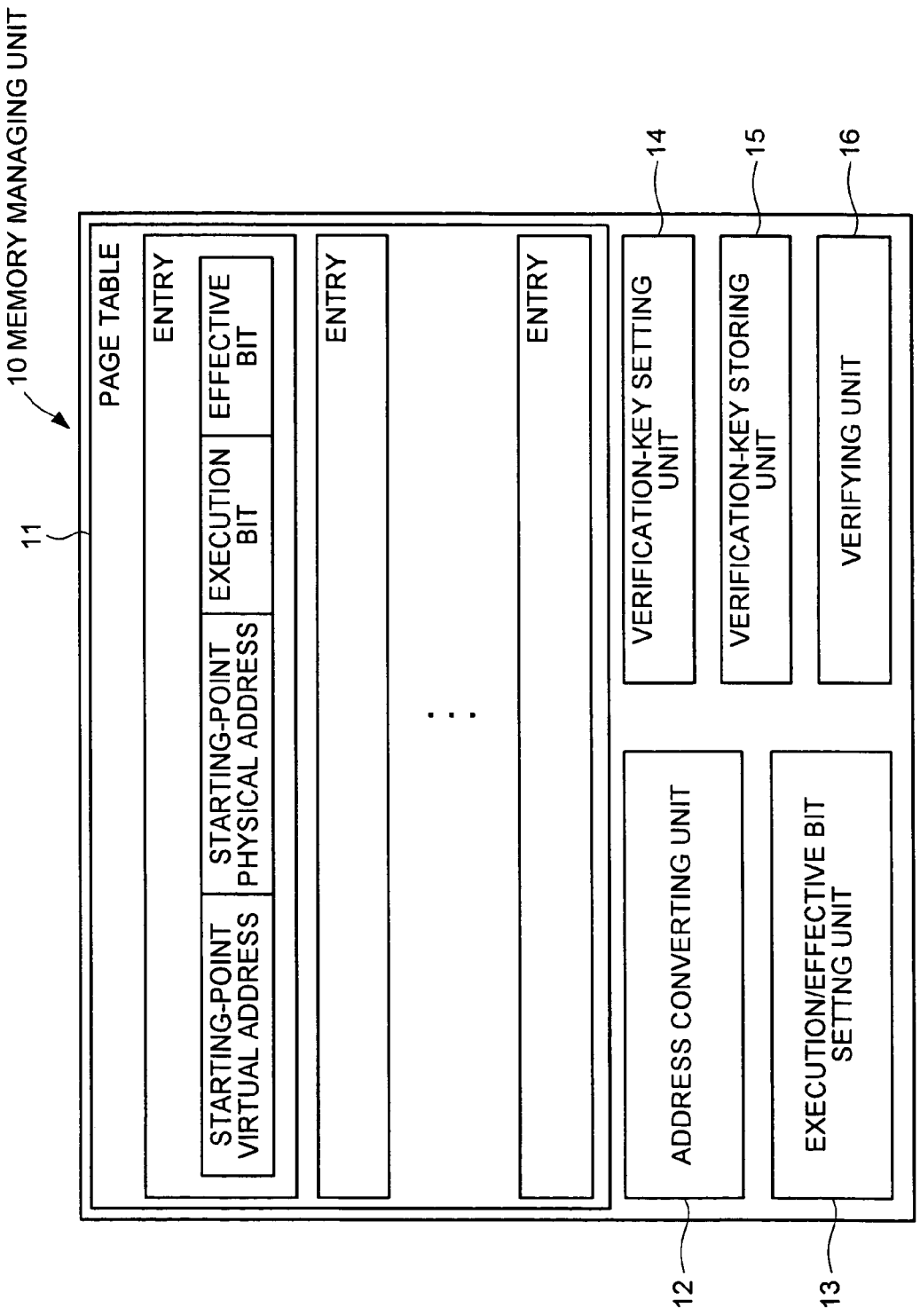
FIG. 2 is a schematic for illustrating a configuration of the memory management unit according to the first embodiment.

The configuration of the memory management unit 10 is explained now. FIG. 2 is a schematic for illustrating a configuration of the memory management unit 10 according to the first embodiment. The memory management unit 10 includes a page table 11, an address converting unit 12, an execution/effective-bit setting unit 13, a verification-key setting unit 14, a verification-key storing unit 15, and a verifying unit 16. The verification-key storing unit 15, the verifying unit 16, and the execution/effective-bit setting unit 13 are corresponding to the "verification-key storing unit", the "verifying unit", and the "control unit" in the claims, respectively.

The page table 11 includes a plurality of entries acquired by the processor 1 when the processor 1 stores the code. The entries are prepared for every page of 4 Kbytes that is a unit for assigning the memory, and includes a starting-point virtual address, a starting-point physical address, an execution bit, and an effective bit, as shown in FIG. 2.

Namely, the entries indicate that a physical page of 4 Kbytes beginning from the "starting-point physical address" is corresponding to a virtual page of 4 Kbytes beginning from the "starting-point virtual address". The "execution bit" indicates that a code, not a data, is stored in the corresponding physical/virtual page, and the "effective bit" indicates that the corresponding physical/virtual page is valid. The length of the page can be variable instead of being fixed. However, in that case, information representing a size is stored in the entry.

The address converting unit 12 is a processing unit that converts the virtual address into the physical address based on the page table 11. When the processor 1 executes a code, the address converting unit 12 searches for an entry, which corresponds to the virtual address input from the processor 1, from the page table 11. When the corresponding entry is found, the address converting unit 12 converts the virtual address into the physical address and outputs the physical address to the memory 2. On the other hand, when the corresponding entry is not found, the address converting unit 12 notifies the processor 1 of an exception of the address conversion.

When the execution bit and the effective bit are set for an entry in the page table 11, the address converting unit 12 only allows reading operation for fetching a code (machine language command) to a corresponding physical/virtual page, and does not allow writing and reading/writing operation for accessing the data.

The execution/effective-bit setting unit 13 is a processing unit that sets an execution bit and an effective bit in a corresponding entry in the page table 11 based on a result of verification by the verifying unit 16. When the validity of the code is verified by the verifying unit 16, the execution/effective-bit setting unit 13 sets the execution bit and the effective bit (sets that the physical/virtual page in which the code to be verified is stored is valid) to allow the processor 1 to execute the code. On the other hand, when the validity of the code is not verified by the verifying unit 16, the execution/effective-bit setting unit 13 does not set the execution bit and the effective bit, and the processor 1 is not allowed to execute the code.

The verification-key setting unit 14 is a processing unit that performs in and out of a verification key from outside of the memory management unit 10 with respect to the verification-key storing unit 15; the verification-key storing unit 15 is a storage unit that stores the verification key used to verify the validity of the code by the verifying unit 16; and the verifying unit 16 is a processing unit that verifies, when the code is stored in the memory 2 and ready to be executed by the processor 1, the validity of the code using the verification key stored in the verification-key storing unit 15 and the verification information stored in the memory for verification information 3.

Upon receiving an instruction for setting the execution/effective bit for a predetermined entry in the page table 11 form the processor 1, the verifying unit 16 reads out the verification information assigned to the code in the corresponding physical page in the memory 2 from the memory for verification information 3, and at the same time, reads out the verification key corresponding to the code from the verification-key storing unit 15 to verify whether the code is safe with ensured validity using the verification information and the verification key. As for a verification method and the verification key, any kind of method, which can ensure that the code is not altered by a third party, can be adopted, such as a public key included in an electronic signature or an electronic certificate based on the public key technology.

When the verifying unit 16 verifies that the code is valid, the verifying unit 16 instructs the execution/effective-bit setting unit 13 to set an execution/effective bit. On the other hand, when the verifying unit 16 does not verify that the code is valid, the verifying unit 16 notifies the processor 1 an exception instead of instructing the execution/effective-bit setting unit 13 to set an execution/effective bit. In this manner, when the processor 1 is notified an exception, the execution of the code by the processor 1 is rejected.

Recently, most of the systems are running on the basis of multitasking in which a plurality of tasks (programs) is executed superficially in parallel. In such cases, the verification-key setting unit 14 controls to replace the verification key stored in the verification-key storing unit 15 with a verification key corresponding to the task when switching between tasks.

A process procedure executed by the system according to the first embodiment is explained now. A process until the processor 1 stores a code in the memory 2 and the memory management unit 10 sets the execution/effective bit is explained.

Figure 4:
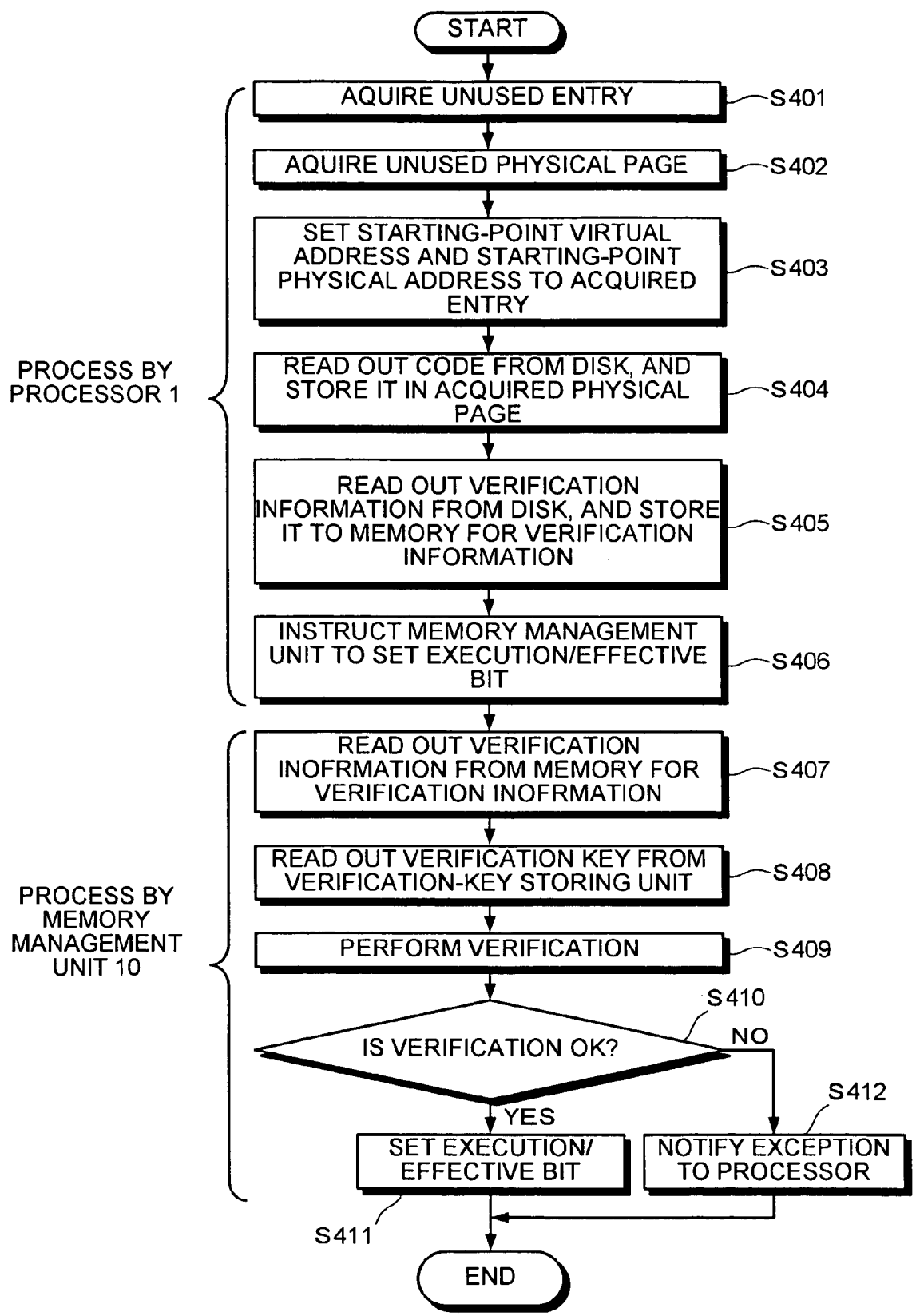
FIG. 4 is a flowchart of a process procedure performed by the system according to the first embodiment.

FIG. 4 is a flowchart of the process procedure executed by the system according to the first embodiment. First of all, the processor 1 acquires an unused entry form the page table 11 of the memory management unit 10 and an unused physical page from the memory 2 (step S401 and step S402). Then, the processor 1 sets a starting-point virtual address and a starting-point physical address to the entry acquired (step S403).

Subsequently, the processor 1 reads out the code from a data storage (disk) such as a hard disk, stores the code in the physical page acquired in the step S402, and at the same time, stores verification information assigned to the code to the memory for verification information 3 (step S404 and step S405). Then, the processor 1 instructs the memory management unit 10 to set an execution/effective bit (step S406).

On the other hand, the memory management unit 10, upon receiving an instruction to set the execution/effective bit, reads out the verification information corresponding to the code relating to the instruction from the memory for verification information 3, and reads out the verification key corresponding to the verification information from the verification-key storing unit 15 (step S407 and step S408). Then, the verifying unit 16 of the memory management unit 10 verifies the validity of the code relating to the instruction using the verification information and the verification key (step S409)

Based on the verification, when it is verified that the code is valid (step S410, YES), the verifying unit 16 instructs the execution/effective-bit setting unit 13 to set the execution/effective bit, and the execution/effective-bit setting unit 13 sets the execution/effective bit for the entry in the page table 11 relating to the code to be verified (step S411). In this manner, the code to be verified is allowed to be executed by the processor 1.

On the contrary, when it is not verified that the code is valid (step S410, NO), the verifying unit 16 notifies the processor 1 an exception instead of instructing the execution/effective-bit setting unit 13 to set the execution/effective bit (step S412). In this manner, the execution of the code to be verified by the processor 1 is rejected.

As described above, according to the first embodiment, the memory management unit 10 stores the verification key used to verify the validity of the code in the verification-key storing unit 15. Then, when the code is stored in the memory 2 and ready to be executed by the processor 1, the memory management unit 10 verifies the validity of the code using the verification key stored in the verification-key storing unit 15 and the verification information assigned to the code (verification information stored in the memory for verification information 3). When the validity of the code is not verified, the memory management unit 10 controls to set that the memory 2 is valid; and when the validity of the code is not verified, the memory management unit 10 controls not to set that the memory 2 is valid. Therefore, the validity of the code to be executed on the information processing apparatus can be ensured with ease and certainty, without changing the architecture of the processor 1 or the memory 2.

In the first embodiment described above, the memory management unit 10 converts the virtual address input from the processor 1 into the physical address to output to the memory 2. However, the present invention is not limited to this scheme. Instead, a memory management unit that outputs the virtual address input from a processor 1 to a memory 2 as the physical address without an address conversion can also be applied in the same manner.

Namely, although the first embodiment covers the memory management unit 10 that is applied to an information processing apparatus that performs the address conversion from the virtual address into the physical address, such as a personal computer, a workstation, or a mobile communication terminal, it can also be applied to an information processing apparatus that does not perform the address conversion from the virtual address into the physical address, such as a personal handyphone system (PHS) terminal, a portable terminal, or a personal digital assistant (PDA) in the same manner.

Figure 5:
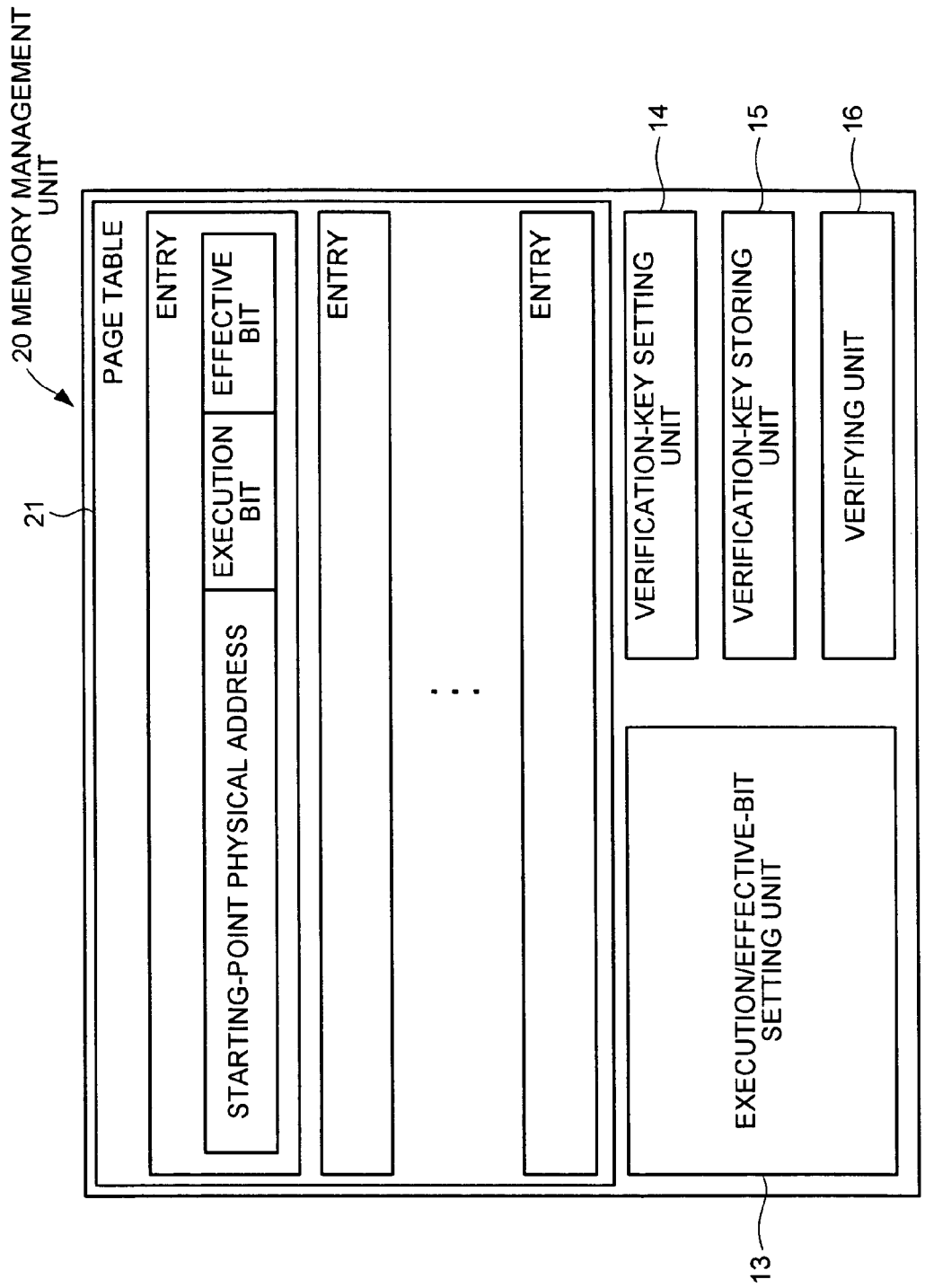
FIG. 5 is a schematic for illustrating a configuration of a memory management unit according to a second embodiment of the present invention.
Figure 6:
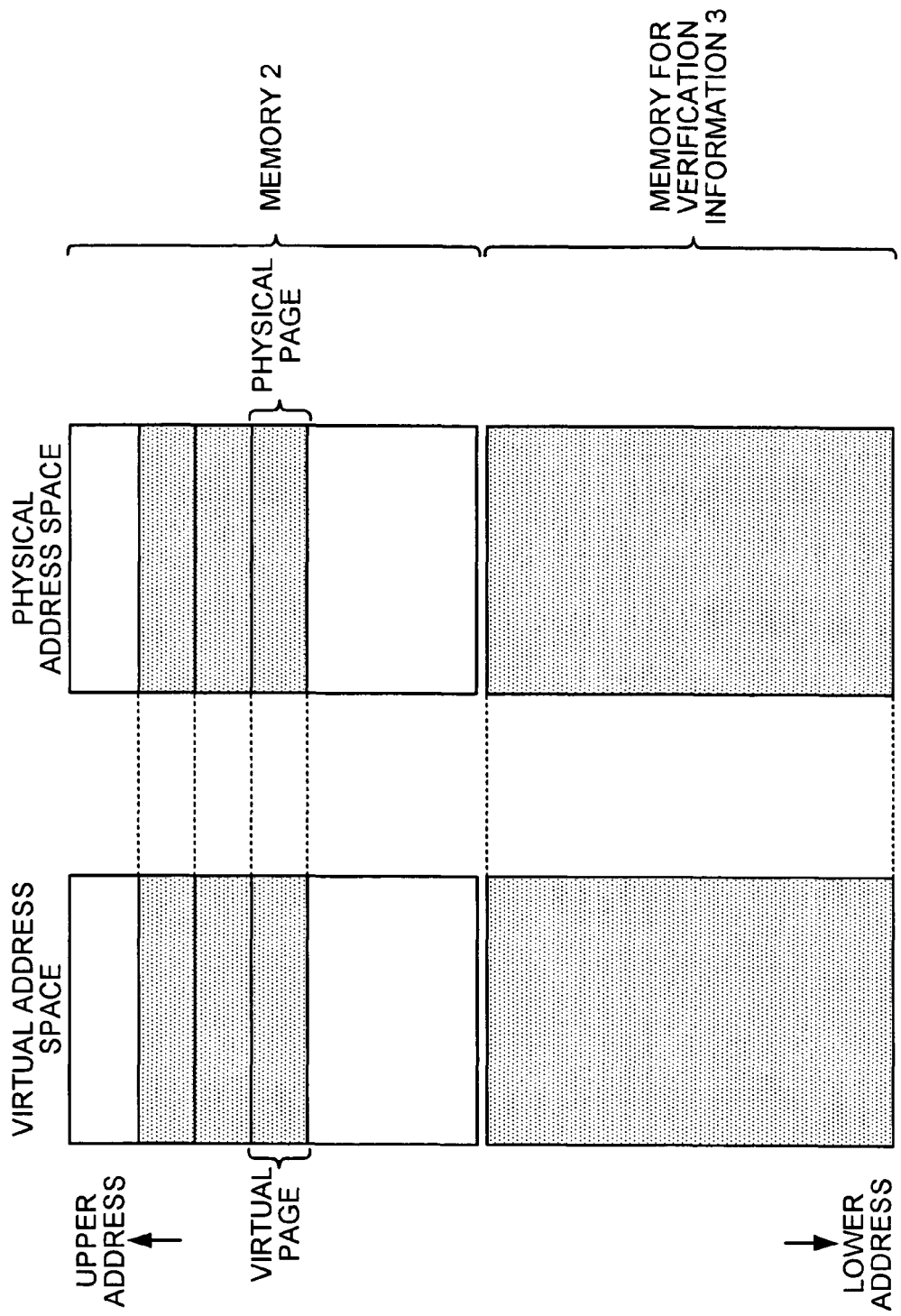
FIG. 6 is a schematic for explaining an address space according to the second embodiment.

In a second embodiment of the present invention, the memory management unit that is applied to a system that does not perform the address conversion from the virtual address into the physical address is explained. FIG. 5 is a schematic for illustrating a configuration of a memory management unit according to the second embodiment; and FIG. 6 is a schematic for explaining an address space according to the second embodiment. Components having the same functions as those described in the first embodiment are assigned with the same reference numerals, and detailed explanation of such components is omitted.

The memory management unit 20 according to the second embodiment outputs the virtual address input from the processor 1 to the memory 2 as the physical address without the address conversion, as described above. Namely, as shown in FIG. 6, an address space according to the second embodiment is different from the address space according to the first embodiment shown in FIG. 2, where the virtual address is identical to the physical address.

The memory management unit 20, as shown in FIG. 5, does not include a processing unit that converts the virtual address into the physical address (the address converting unit 12 shown in FIG. 2). Even each of entries in a page table 21 does not include a starting-point virtual address, but only includes a starting-point physical address. The number of the entries in the page table 21 is the same as the number of the physical pages present.

Therefore, when the processor 1 executes the code, the memory management unit 20 outputs the virtual address input form the processor 1 to the memory 2 as the physical address that is the address on the memory 2. The verification process by the memory management unit 20 is the same as the process (step S407 to step S412) by the memory management unit 10 shown in FIG. 4.

As described above, even for an information processing apparatus that does not perform the address conversion from the virtual address into the physical address, such as a PHS terminal, a portable terminal, or a PDA, the memory management unit 20 according to the second embodiment can ensure the validity of the code executed on the information processing apparatus with ease and certainty, without changing the architecture of the processor 1 or the memory 2.

The first and the second embodiments covered the memory management unit 10 and the memory management unit 20 that verify the validity of the code before executing the code. However, it is also possible to verify the validity of the code as easily and certainly as the first and the second embodiments by encoding a code in advance and decrypting the encrypted code before executing the code.

In a third embodiment of the present invention, a memory management unit is explained that ensures the validity of the code with ease and certainty by decrypting a code that is encrypted in advance before executing the code. An outline and main features of a system to which the memory management unit according to the third embodiment is applied is explained first, followed by an explanation of a configuration of the memory management unit, and finally, a process procedure by the system is explained.

Figure 7:
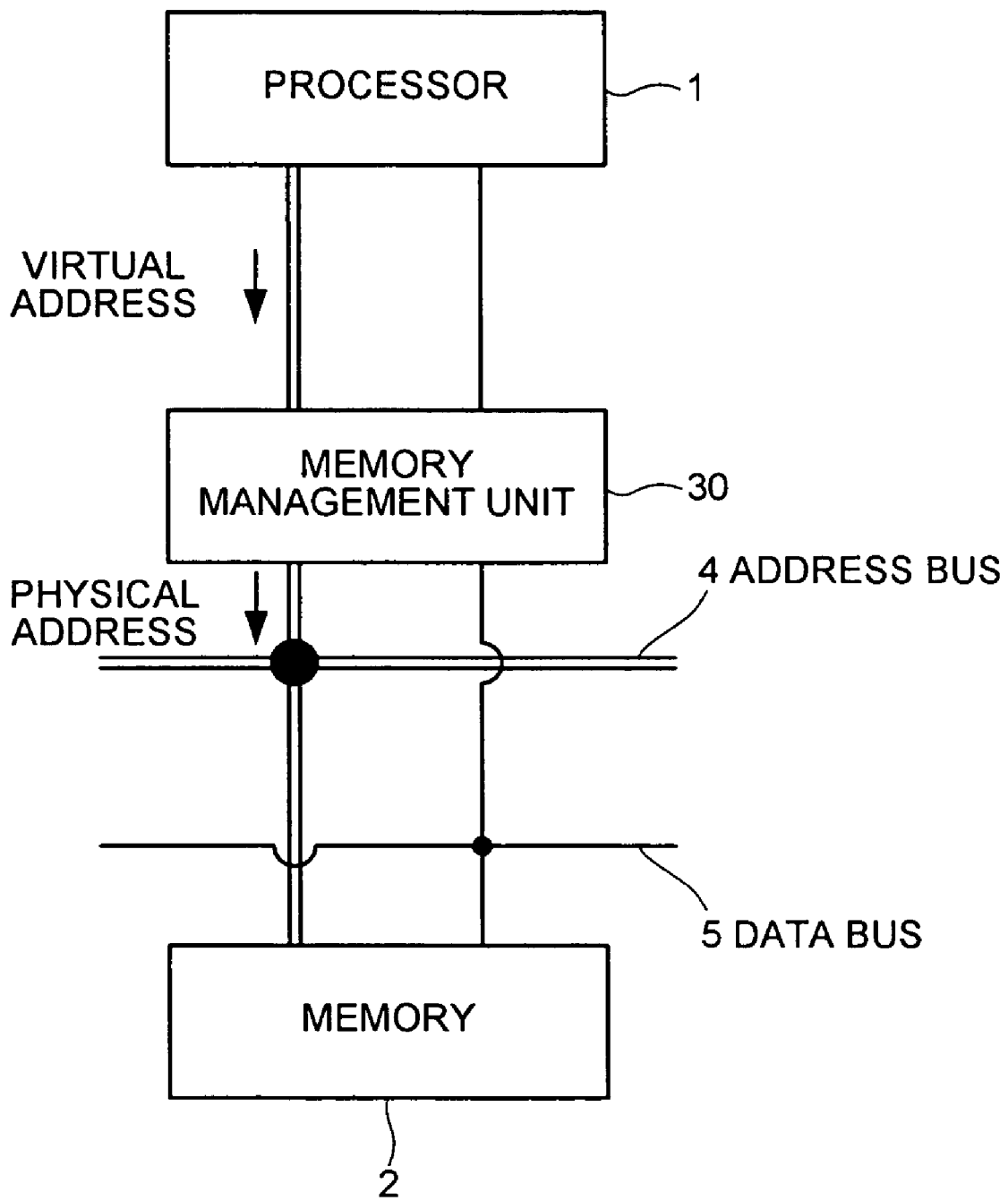
FIG. 7 is a block diagram of a system configuration to which the memory management unit according to a second embodiment is applied.

First of all, the outline and main features of a system to which the memory management unit according to the third embodiment is applied is explained. FIG. 7 is a block diagram of a system configuration to which the memory management unit according to the second embodiment is applied. The system includes a memory management unit 30 arranged between a processor 1 and a memory 2, connected each other via an address bus 4 and a data bus 5. Components having the same functions as those described in the first embodiment are assigned with the same reference numerals, and detailed explanation of such components is omitted.

The system shown in FIG. 7 is schematically similar to the system shown in FIG. 1 that executes the code stored in the memory by the processor 1. However, compared with the system shown in FIG. 1, the system shown in FIG. 7 does not include the memory for verification information 3, and includes a memory management unit 30 having a different function from that of the memory management unit 10. Namely, in the third embodiment, a code is encrypted in advance, and the memory management unit 30 decrypts the code encrypted in advance to ensure the validity of the code with ease and certainty without changing the architecture of the processor 1 or the memory 2.

The memory management unit 30 stores a decryption key to decrypt the code encrypted in advance, and when the processor 1 stores the encrypted code in the memory 2, decrypts the encrypted code using the decryption key. Then, the memory management unit 30 re-stores the code decrypted in the memory 2, and at the same time, sets that the memory 2 is valid to allow the processor 1 to execute the code. If the decryption of the encrypted code ends up with a failure, the memory management unit 30 does not set that the memory 2 is valid, and rejects the execution of the code by the processor 1.

With this mechanism, since the memory management unit 30, which is hardware that the malice third party cannot manipulate, decrypts an encrypted code at a predetermined moment just before execution of the code (i.e., at a timing when a conversion of a virtual page into a physical page becomes effective), it is possible to execute the code as a code with an ensured validity (a code that is not altered by a malice third party before or after installation of the code). Furthermore, since the memory management unit 30 having this type of decryption function does not need to change the architecture of the processor 1 or the memory 2, it is possible to develop much easier, compared with developing a processor 1 or a memory 2 having a decryption function.

From this point of view, according to the memory management unit 30 according to the third embodiment, the above main feature can be exercised that the validity of the code executed on the information processing apparatus can be ensured with ease and certainty, without changing the architecture of the processor 1 or the memory 2, like the memory management unit 10 and 20 according to the first and the second embodiments.

The memory management unit 30 according to the third embodiment converts, in the same manner as the memory management unit 10 according to the second embodiment, the virtual address input form the processor 1 to the physical address that is the address on the memory 2 and outputs the physical address to the memory 2. In other words, the memory management unit 30 can be applied to an information processing apparatus, such as a personal computer or a mobile communication terminal, that perform address conversion from virtual address into a physical address, and the address space according to the third embodiment is same as that shown in FIG. 3.

Figure 8:
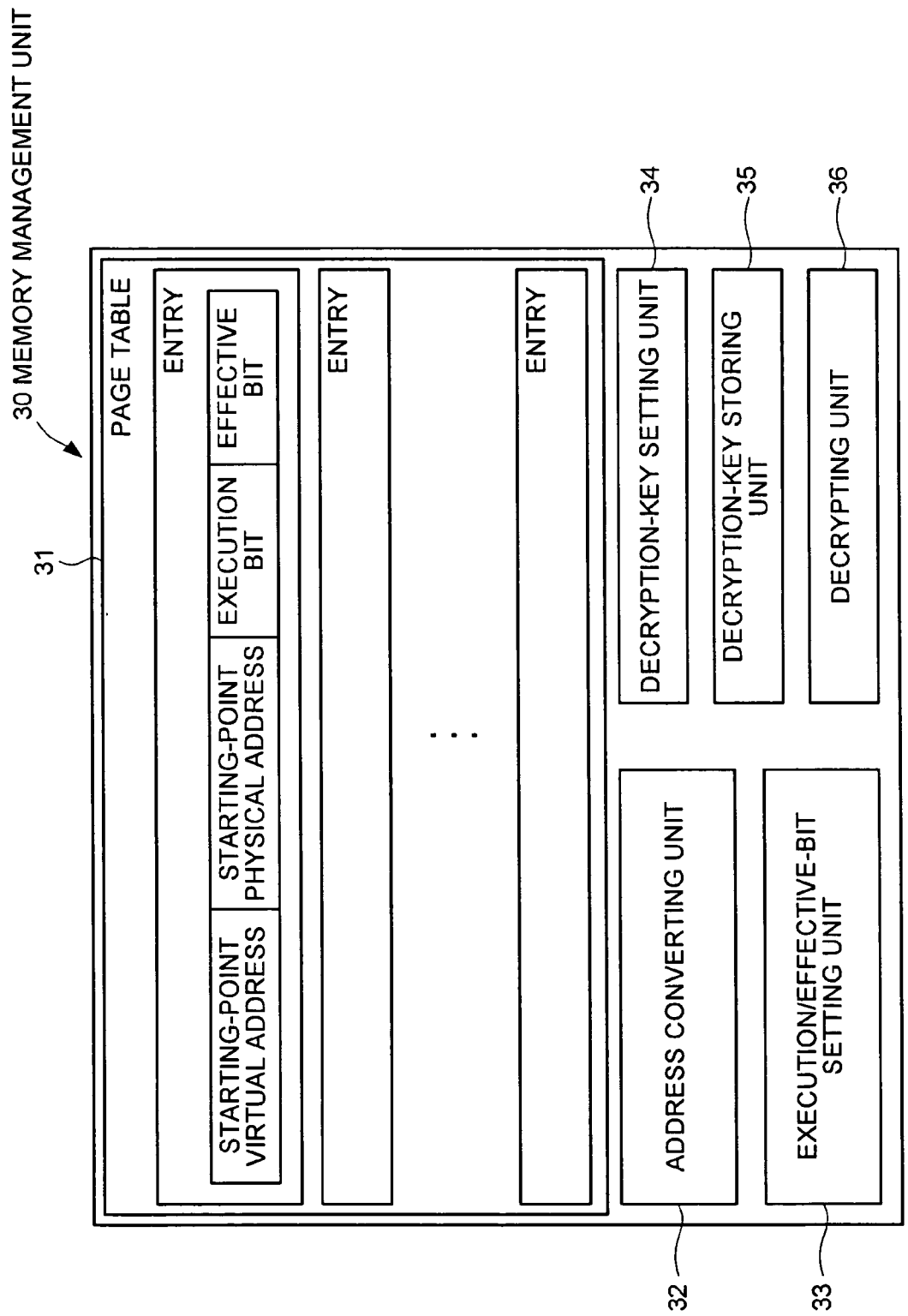
FIG. 8 is a schematic for illustrating a configuration of a memory management unit according to a third embodiment of the present invention.

The configuration of the memory management unit 30 shown in FIG. 7 is explained now in detail. FIG. 8 is a schematic for illustrating a configuration of a memory management unit according to the third embodiment. As shown in the figure, the memory management unit 30 includes a page table 31, an address converting unit 32, an execution/effective-bit setting unit 33, a decryption-key setting unit 34, a decryption-key storing unit 35, and a decrypting unit 36. The decryption-key storing unit 35, the decrypting unit 36, and the execution/effective-bit setting unit 33 are corresponding to the "verification-key storing unit", the "verifying unit", and the "control unit" in the claims, respectively.

The page table 31 and the address converting unit 32 performs the same function as that of the page table 11 and the address converting unit 12 described in the first embodiment, respectively.

The execution/effective-bit setting unit 33 performs a similar function as the execution/effective-bit setting unit 13 described in the first embodiment, however, a different point is that the execution/effective-bit setting unit 33 sets an execution bit and an effective bit in a corresponding entry in the page table 31 in response to a process of the decrypting unit 36. Namely, when the decrypting unit 36 decrypts a code, and a decrypted code is re-stored in the memory 2, the execution/effective-bit setting unit 33 sets the execution bit and the effective bit in the corresponding entry in the page table 31 (sets that the physical/virtual page in which the decrypted code is stored is valid).

The decryption-key setting unit 34 is a processing unit that performs in and out of a decryption key from outside of the memory management unit 30 with respect to the decryption-key storing unit 35; the decryption-key storing unit 35 is a storage unit that stores the decryption key used to decrypt the encrypted code; and the decrypting unit 36 is a processing unit that decrypts, when the encrypted code is stored in the memory 2, the encrypted code using the decryption key stored in the decryption-key storing unit 35.

Upon receiving an instruction for setting the execution/effective bit for a predetermined entry in the page table 31 form the processor 1, the decrypting unit 36 reads out the encrypted code in the corresponding physical page in the memory 2, and at the same time, reads out the decryption key corresponding to the code from the decryption-key storing unit 35 to decrypt the encrypted code using the decryption key. As for the encryption and decryption method, an arbitrary method can be adopted, such as a public key included in an electronic signature or an electronic certificate based on the public key technology.

The decrypting unit 36, upon completing the decryption of the code, re-stores the decrypted code in the memory 2, and instructs the execution/effective-bit setting unit 33 to set an execution/effective bit.

Recently, most of the systems are running on a basis of multitasking in which a plurality of tasks (programs) is executed superficially in parallel. In such cases, the decryption-key setting unit 34 controls to replace the decryption key stored in the decryption-key storing unit 35 with a decryption key corresponding to the task when switching between tasks.

A process procedure executed by the system according to the third embodiment is explained. A process until the processor 1 stores an encrypted code in the memory 2 and the memory management unit 30 sets the execution/effective bit is explained.

Figure 9:
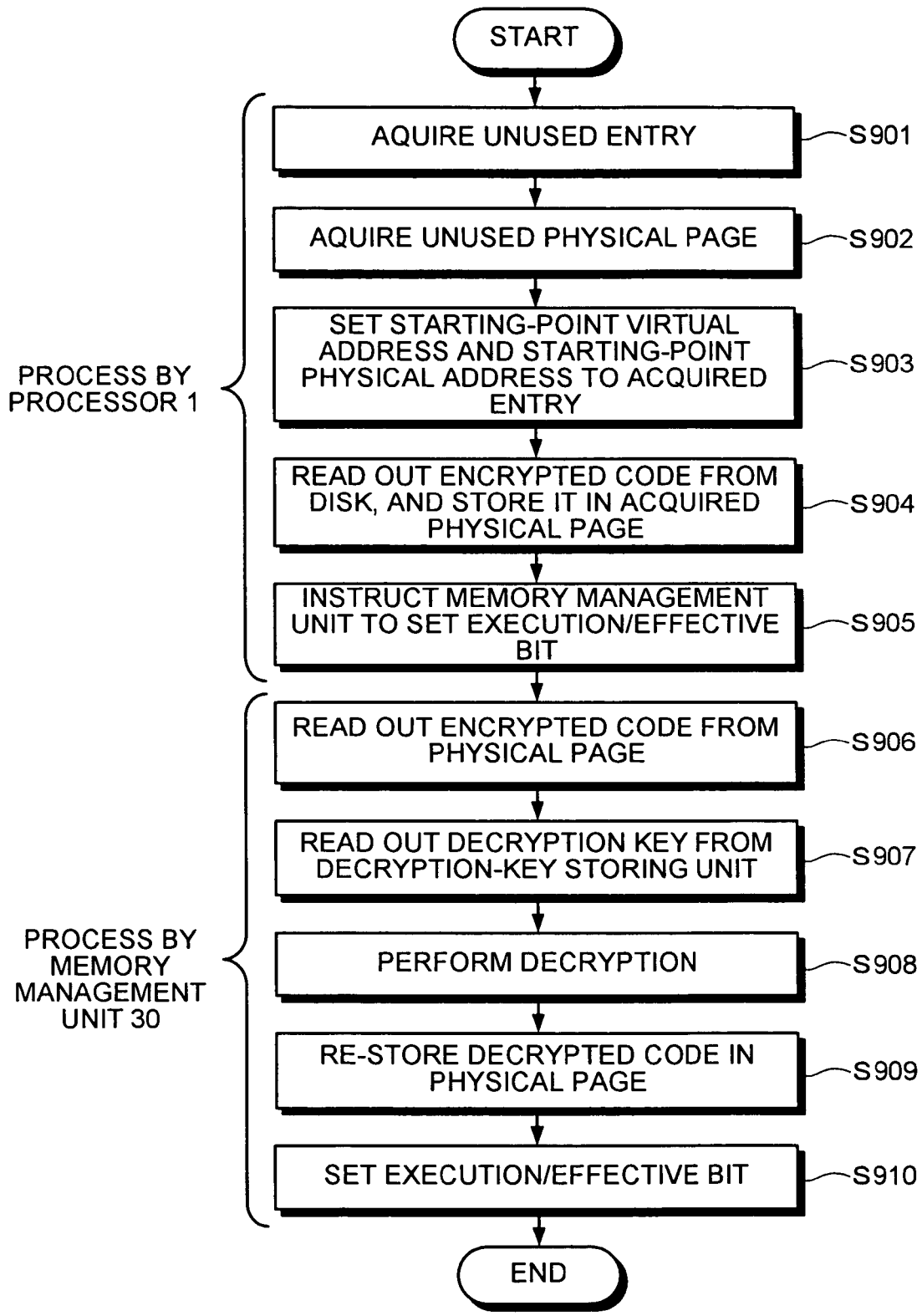
FIG. 9 is a flowchart of a process procedure performed by a system according to the third embodiment.

FIG. 9 is a flowchart of the process procedure executed by the system according to the third embodiment. First of all, the processor 1 acquires an unused entry form the page table 31 of the memory management unit 30 and an unused physical page from the memory 2 (step S901 and step S902). Then, the processor 1 sets a starting-point virtual address and a starting-point physical address to the entry acquired (step S903).

Subsequently, the processor 1 reads out the encrypted code from a data storage (disk) such as a hard disk, stores the encrypted code in the physical page acquired in the step S902. Then, the processor 1 instructs the memory management unit 30 to set an execution/effective bit (step S905).

On the other hand, the memory management unit 30, upon receiving an instruction to set the execution/effective bit, reads out the encrypted code from the physical page on the memory corresponding to the code relating to the instruction, and reads out the decryption key corresponding to the code from the decryption-key storing unit 35 (step S906 and step S907). Then, the decryption unit 36 of the memory management unit 30 decrypts the encoded code using the decryption key (step S908)

The decryption unit 36 of the memory management unit 30 re-stores the decrypted code in the memory 2, and instructs the execution/effective-bit setting unit 33 to set the execution/effective bit (step S909). Then, the execution/effective-bit setting unit 33 sets the execution bit and the effective bit in an entry in the page table 31 relating to the code to be decrypted (step S910). In this manner, the code to be decrypted is allowed to be executed by the processor 1.

As described above, according to the third embodiment, the memory management unit 30 stores the decryption key used to decrypt an encrypted code in the decryption-key storing unit 35. Then, when the encrypted code is stored in the memory 2 by the processor 1, the memory management unit 30 reads out the encrypted code from the memory 2, decrypts the encrypted code using the decryption key stored in the decryption-key storing unit 35, re-stores the decrypted code in the memory 2, and sets that the memory 2 in which the decrypted code is stored is valid. Therefore, like the first and the second embodiments, the validity of the code to be executed on the information processing apparatus can be ensured with ease and certainty, without changing the architecture of the processor 1 or the memory 2.

In the third embodiment described above, the memory management unit 30 converts the virtual address input from the processor 1 into the physical address to output to the memory 2. However, the present invention is not limited to this scheme. Instead, a memory management unit that outputs the virtual address input from a processor 1 to a memory 2 as the physical address without an address conversion can also be applied in the same manner. Namely, like the second embodiment, the memory management unit can also be applied to an information processing apparatus that does not perform the address conversion from the virtual address into the physical address, such as a personal handyphone system (PHS) terminal, a portable terminal, or a personal digital assistant (PDA) in the same manner.

In a fourth embodiment of the present invention, the memory management unit that is applied to a system is explained that does not perform the address conversion from the virtual address into the physical address, and exercises a similar effect as the third embodiment. FIG. 10 is a schematic for illustrating a configuration of a memory management unit according to the fourth embodiment. Components having the same functions as those described in the third embodiment are assigned with the same reference numerals, and detailed explanation of such components is omitted.

The memory management unit 40 according to the fourth embodiment outputs the virtual address input from the processor 1 to the memory 2 as the physical address without the address conversion, as described above. Namely, in the address space according to the fourth embodiment, the, virtual address is identical to the physical address, as shown in FIG. 6.

The memory management unit 40, as shown in FIG. 10, does not include a processing unit that converts the virtual address into the physical address (the address converting unit 32 shown in FIG. 8). Even each of entries in a page table 41 does not include a starting-point virtual address, but only includes a starting-point physical address. The number of the entries in the page table 41 is the same as the number of the physical pages present.

Therefore, like the memory management unit 20, the memory management unit 40 outputs the virtual address input form the processor 1 to the memory 2 as the physical address that is the address on the memory 2, when the processor 1 executes the code. The decryption process by the memory management unit 40 is the same as the process (step S407 to step S412) by the memory management unit 30 shown in FIG. 9 (the memory management unit 30 according to the third embodiment).

As described above, even for an information processing apparatus that does not perform the address conversion from the virtual address into the physical address, such as a PHS terminal, a portable terminal, or a PDA, the memory management unit 40 according to the fourth embodiment can ensure the validity of the code executed on the information processing apparatus with ease and certainty, without changing the architecture of the processor 1 or the memory 2.

Although the exemplary embodiments of the present invention are explained so far, the present invention can be carried out in various types of different embodiments within the scope of technical idea described in the claims.

For example, in the first and the second embodiments, a verification function is added to the memory management unit 10 and the memory management unit 20. However, the present invention is not limited to this scheme. The code can also be verified by arranging a dedicated hardware for the verification function (corresponding to the "code verifying apparatus" in the claim(s)) in the memory management unit 10 and the memory management unit 20 separately, so that the dedicated hardware cooperates with the memory management unit 10 and the memory management unit 20 to verify the validity of the code.

Similarly, in the third and the fourth embodiments, a decryption function is added to the memory management unit 30 and the memory management unit 40. However, the present invention is not limited to this scheme. The code can also be verified by arranging a dedicated hardware for the decryption function (corresponding to the "code decrypting apparatus" in the claim) in the memory management unit 30 and the memory management unit 40 separately, so that the dedicated hardware cooperates with the memory management unit 30 and the memory management unit 40 to verify the validity of the code.

Among the processes described in the present embodiments, a part of or all the processes explained as operated in an automatic manner can be operated manually. On the contrary, a part of or all the processes explained as operated in a manual manner can be operated automatically using a known method. Besides, all the information including process procedure, control procedure, specific name, various data, and parameters described in the above texts or drawings can be optionally changed except of a case specially mentioned. Similarly, contents of various input screen can also be optionally changed.

Furthermore, each of the components of the apparatuses shown in the drawings is functionally and schematically drawn, and is not necessarily formed physically in exactly the same manner as shown in the drawings. In other words, the concrete configuration of division and combination of each component is not limited to the one shown in the drawings. A part of or all the components can be configured by functionally or physically dividing and combining the components in arbitrary unit according to various loads or condition of use. Moreover, regarding each of process functions performed in each of the components, a part of or all the process functions can be implemented by a CPU or a program that is interpreted and executed by the CPU, or implemented as hardware formed by a wired logic.

As described above, according to the present invention, for a code having a safety problem due to an illegal change by a malice third party before or after installation of the code, the memory management unit, which is hardware that the malice third party cannot manipulate, definitely verify that the code is not valid at a predetermined moment just before execution of the code (i.e., at a timing when a conversion of a virtual page into a physical page becomes effective). Therefore, it is possible to avoid the execution of the code by the processor. Besides, since the memory management unit having this type of verification function does not need to change the architecture of the processor or the memory, it is possible to develop much easier, compared with developing a processor or a memory having a verification function. Consequently, it is possible to obtain a memory management unit that ensures the validity of the code executed on the information processing apparatus with ease and certainty, without changing the architecture of the processor or the memory.

Furthermore, according to the present invention, since the memory management unit, which is hardware that the malice third party cannot manipulate, decrypts an encrypted code at a predetermined moment just before execution of the code (i.e., at a timing when a conversion of a virtual page into a physical page becomes effective), it is possible to execute the code as a code with an ensured validity (a code that is not altered by a malice third party before or after installation of the code). Besides, since the memory management unit having this type of decryption function does not need to change the architecture of the processor or the memory, it is possible to develop much easier, compared with developing a processor or a memory having a decryption function. Consequently, it is possible to obtain a memory management unit that ensures the validity of the code executed on the information processing apparatus with ease and certainty, without changing the architecture of the processor or the memory.

Moreover, according to the present invention, it is possible to obtain a memory management unit that can be applied to an information processing apparatus that performs an address conversion from a virtual address into a physical address, such as a personal computer, a workstation, or a mobile communication terminal, and ensures the validity of the code executed on the information processing apparatus with ease and certainty.

Furthermore, according to the present invention, it is possible to obtain a memory management unit that can be applied to an information processing apparatus that does not perform the address conversion from the virtual address into the physical address, such as a PHS terminal, a portable terminal, or a PDA, and ensures the validity of the code executed on the information processing apparatus with ease and certainty.

Moreover, according to the present invention, it is possible to obtain a memory management unit that can ensure the validity of an extremely important code that is executed on an information processing apparatus as a fundamental software with ease and certainty, without changing the architecture of the processor or the memory.

Furthermore, according to the present invention, it is possible to obtain a code verifying apparatus that can ensure the validity of a code executed on an information processing apparatus with ease and certainty, without changing the architecture of the processor or the memory.

Moreover, according to the present invention, it is possible to obtain a code decrypting apparatus that can ensure the validity of a code executed on an information processing apparatus with ease and certainty, without changing the architecture of the processor or the memory.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A memory management unit that manages a memory that stores a code, and sets that the memory that stores the code to be executed is valid to make a processor execute the code, comprising:
   a page table that includes a plurality of entries prepared for each page of the memory, wherein at least one of the entries stores an effective bit indicating whether a corresponding page for which the entry was prepared is valid and an execution bit indicating that the corresponding page stores a code;
   a verification-key storing unit that stores a verification key used to verify a validity of the code;
   a verifying unit that verifies, when the processor stores the code in a code storing page of the memory and issues an instruction to set the effective bit of the code storing page just before executing the code, the validity of the code using the verification key stored in the verification-key storing unit and verification information assigned to the code stored in the code storing page of the memory; and
   a control unit that sets that the code storing page is valid in an entry of the page table corresponding to the code storing page when the validity is verified by the verifying unit.

2. The memory management unit according to claim 1, wherein the memory management unit converts, when the processor executes the code, a virtual address input by the processor into a physical address that is an address on the memory, and outputs the physical address converted to the memory.

3. The memory management unit according to claim 1, wherein the memory management unit outputs, when the processor executes the code, a virtual address input by the processor to the memory as a physical address that is an address on the memory.

4. The memory management unit according to claim 1, wherein the code is a program described in machine language and interpreted by a central processing unit as the processor to be executed.

5. A code verifying apparatus that verifies a validity of a code that is stored in a page of memory and executed by a processor, based on verification information assigned to the code, comprising:

a page table that includes a plurality of entries prepared for each page of the memory, wherein at least one of the entries stores an effective bit indicating whether a corresponding page for which the entry was prepared is valid and an execution bit indicating that the corresponding page stores a code;

a verification-key storing unit that stores a verification key used to verify the validity of the code, the verification key corresponding to the verification information;

a verifying unit that verifies, when the processor stores the code in a code storing page of the memory and issues an instruction to set the effective bit of the code storing page just before executing the code, the validity of the code using the verification key stored in the verification-key storing unit and the verification information assigned to the code stored in the code storing page of the memory; and a control unit that sets that the code storing page is valid in an entry of the page table corresponding to the code storing page when the validity is verified by the verifying unit, and allows the processor to execute the code stored in the code storing page of the memory.

* * * * *